United States Patent Office 3,017,393
Patented Jan. 16, 1962

3,017,393
STABILIZATION OF POLYMERS
OF PYRROLIDONE
William O. Ney, Jr., Lincoln Township, Washington County, Minn., assignor to Minnesota Mining and Manufacturing Company, St. Paul, Minn., a corporation of Delaware
No Drawing. Filed Jan. 27, 1958, Ser. No. 711,162
5 Claims. (Cl. 260—78)

This invention relates to polymers of pyrrolidone and more particularly to a process for the stabilization of polymers of pyrrolidone toward decomposition on heating.

Polypyrrolidone is produced by the polymerization of pyrrolidone, a five membered lactam containing 4 carbon atoms. The polymer and the process for its preparation are described in U.S. Patent 2,638,463. Polypyrrolidone is a thermoplastic material which can be employed for the production of filaments, fibers, molding components and the like. It is characterized by recurring units which may be designated by the formula:

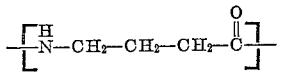

While it has been possible heretofore to produce fibers from polypyrrolidone by processes of wet or dry spinning from solutions of polypyrrolidone in formic acid, as disclosed in U.S. Patent 2,711,398, it has been found that it is difficult to extrude, mold or melt-spin polypyrrolidone because of its instability towards heat. When polypyrrolidone as produced by the process of U.S. Patent 2,638,-463 is heated to temperatures in the region of its melting point, the polymer is quickly degraded into what is apparently monomeric pyrrolidone, which boils, thereby causing the molten mass to foam, while the monomer is lost through evaporation. This decomposition on heating, with resulting loss in polymer weight, is herein termed thermal degradation. Such behavior upon heating substantially precludes successful melt spinning or extrusion of the substance. Furthermore, easily degraded material which is sensitive to heat does not lend itself to the fabrication of articles which must be subjected to elevated temperatures, as in bearings, electrical insulation and the like.

It is an object of this invention to provide a process for increasing the stability of polymers of pyrrolidone toward heat. It is another object of the invention to purify polypyrrolidone so as to remove water-soluble impurities therefrom. It is another object of the invention to provide a stabilized polypyrrolidone. Other objects of the invention will be apparent from the disclosures herein made.

It is known that in the processes presently available for the polymerization of pyrrolidone, the polymer must be washed to remove the catalyst and any remaining monomer. If not removed, the monomer and inorganic matter apparently tend to facilitate thermal decomposition. Heretofore, the removal of these substances from polymers of pyrrolidone has commonly been attempted by washing with water. While the stability toward depolymerization is thereby improved, nevertheless the rate of degradation to monomer upon heating is still so rapid as to render melt-spinning very difficult. Other solvents, such as alcohols, acetone and the like have been employed for washing purposes but the results therewith are no better than those obtained using water, except as respects removal of colored impurities. While acids have been used to dissolve polypyrrolidone, it appears that the art was heretofore unaware that dilute carboxylic acids could be advantageously employed to treat polymers of pyrrolidone.

In accordance with the objects of the invention, it has been found that by treating polymers of pyrrolidone with a dilute aqueous organic carboxylic acid, polymeric material can be produced which is far less sensitive to heat at temperatures approaching its melting point than similar material which has simply been washed with water or lower alcohols. As the catalysts used and the pyrrolidone monomer are both very soluble in water or in lower alcohols, so that simple washing would be expected to remove them rapidly and completely, it appears that the process of the invention is more complicated than a mere washing procedure.

Broadly speaking, the process is carried out by slurrying finely divided polymers of pyrrolidone with an aqueous solution of certain organic carboxylic acids having a concentration in the range of about 0.5 percent to about 25 percent. Preferably, lower fatty acids are employed in the process, and, for example, formic acid, acetic acid, propionic acid, butyric acid and the like, as well as mixtures thereof, may be used. The polymer which is treated can be material just removed from the polymerization reactor, or previously alcohol or water-washed polymer can be employed. It is only necessary that the material be in a convenient state of division so that the entire mass of polymer is contacted. Obviously, if finer particles are treated shorter treatment times will be necessary, all other things being equal. The amount of solution used is not critical, except that it is obvious that a volume at least sufficient to wet the polymer thoroughly must be employed. The use of an excess amount of the acidic agent on the other hand is not disadvantageous. The operation can be repeated one or more times, depending upon the equipment available and the degree of treatment desired. Preferably, from 1 to 5 volumes of the aqueous acidic agent are employed. In principle, the treatment consists of contacting the finely divided polymer of pyrrolidone with dilute acidic agent, and removing the polymer from the resulting slurry, as for example by filtration, centrifugation, and the like. The treated polymer is then dried and is ready for use.

Copolymers of pyrrolidone are equally well adapted to treatment by the process of the invention. Thus, the copolymer of ε-caprolactam and pyrrolidone can be stabilized toward evolution of monomer on heating in the same way as the polypyrrolidone itself. As used herein, the term "polymer" includes both homopolymers and copolymers of pyrrolidone.

The polymers of pyrrolidone produced by the process of the invention is significantly changed in its properties with respect toward heating. Whereas ordinary polypyrrolidone produced by the process of the above-mentioned patent, even after it is washed with water or with water and organic solvents, commonly loses up to 30 percent of its weight when heated at 250° C. for thirty minutes, polypyrrolidone which has been treated with dilute aqueous organic carboxylic acid solutions according to the process of the invention loses only about 5 percent of its weight after heating for the same length of time at the same temperature. Incidentally, of course, water-soluble impurities such as alkali metal salts and monomeric pyrrolidone are also removed.

The treated polymer of pyrrolidone which is produced is substantially pure white in color and has inherent viscosity which is unchanged from that originally found before washing. Owing to its relatively slow rate of decomposition on heating, it is more readily extruded or spun from the molten state.

The following examples, which are illustrative of the process and of the product produced thereby, will more specifically describe the process of the invention. They are, however, not to be construed in any way as limiting, but merely as exemplary.

EXAMPLE 1

Polypyrrolidone, prepared by the generally known procedure as described in the U.S. patents hereinabove referred to, is an amorphous solid in the form of free-flowing granular particles that are substantially white in color. It is washed with 2 volumes of methanol, by suspending the granular material in methanol for about one hour. The methanol is removed and the granular polymer is slurried in two volumes of one percent acetic acid for about one hour. The slurry is filtered, and the filter cake is again suspended in two volumes of one percent acetic acid for an hour as before. The operation is repeated and the filter cake recovered from the last treatment is dried in a vacuum oven for 18 hours at about 5 millimeters pressure of mercury and at a temperature of about 70° C. Several samples are thus prepared.

As a control, several samples of polypyrrolidone are prepared in the same manner, and are first washed with two volumes of methanol, and then washed three times in successive amounts of two volumes of distilled water for one hour each time. These (designated as water-washed polymer samples) are then dried in the same manner as set forth above.

Comparison of the stability of samples of these toward heat were made as follows: Samples of acid-treated polymer and water-washed polymer were heated for a period of one-half hour at 250° C. at a pressure of $10^{-4}$ millimeters of mercury. One pair of samples was also heated for 1 hour at 250° C. At the end of the period of heating, the weight loss of each sample was determined and recorded in percent of the starting weight. The following table sets forth the test results.

Table 1

| Method of Treatment | Percent Weight Loss | |
|---|---|---|
|  | ½ hour | 1 hour |
| Acid treated | 7.3 |  |
| Do | 5 |  |
| Do | 7.7 |  |
| Do |  | 18 |
| Water-washed | 20.5 |  |
| Do | 30.8 |  |
| Do | 31.6 |  |
| Do |  | 99 |

When the washed but not yet dried polymer is treated with about one volume of methanol and filtered, the resulting filter cake can be dried much more rapidly in a vacuum oven than the polypyrrolidone which is wet with water. The tets results remain unchanged.

EXAMPLE 2

Finely divided polypyrrolidone obtained by polymerization of pyrrolidone in the presence of petroleum ether according to the process disclosed in U.S. 2,739,959, and which has been previously washed with methanol, is slurried three times with successive 2 volume quantities of 1 percent acetic acid, the slurry being permitted to stand for about 1 hour at room temperature before filtering on each occasion. Following the last treatment with acetic acid, the polymer is placed in a vacuum oven for about 18 hours at 70° C. to remove the water therefrom. The resulting white powder is tested to determine its stability toward heat by heating a sample of the powder for one half hour at 250° C. and at a pressure of $10^{-4}$ millimeters of mercury. It is found that the polymer loses about 6 percent in weight.

EXAMPLE 3

When the procedure of Example 2 is repeated, but using aqueous 5 percent propionic acid, substantially the same results are obtained. Likewise, the use of 1 percent formic acid gives greatly improved heat stability.

EXAMPLE 4

A copolymer of pyrrolidone with caprolactam which contains about 3 parts of pyrrolidone for each part of caprolactam is prepared as follows: A container equipped for agitation and distillation under reduced pressure is charged with 50 parts of pyrrolidone, 50 parts of ε-caprolactam and 215 parts of xylene. The reaction mixture is warmed and a solution of 2.2 parts of 85 percent potassium hydroxide in 3 parts of water is added dropwise while distillation is carried out under a pressure of about 18 millimeters of mercury at a temperature of about 45° C. The temperature gradually rises and heating and distillation are continued until the temperature of the contents of the vessel is about 90° C. The residue is then cooled to about 25° C. and 125 parts of anhydrous heptane and 1.47 parts of N-acetyl pyrrolidone are added to the reaction mixture. The mixture is stirred for about 2 days at 25° C., during which time an insoluble granular copolymer separates. The copolymer is removed by filtration and is slurried in about 2 volumes of 0.5 percent aqueous acetic acid. The acid treated polymer is removed by filtration and washed twice in about 2 volume quantities of water. The water having been removed by filtration, the remaining washed copolymer is dried under vacuum at about 70° C. for about 24 hours.

When heated at 250° C. for about 30 minutes under a pressure of $10^{-4}$ millimeters of mercury, the copolymer lost about 3 percent in weight.

What is claimed is:
1. The process for stabilizing heat-sensitive solid polypyrrolidone against loss of weight on heating, which comprises slurrying the said polypyrrolidone in finely divided solid state with several volumes of an aqueous solution containing from about 0.5 to about 25 percent of a lower aliphatic monocarboxylic acid, removing the polypyrrolidone from the aqueous acid and drying the treated polymer, said polypyrrolidone being insoluble in said aqueous acid solution.
2. The process according to claim 1, wherein the acid is acetic acid.
3. The process according to claim 1, wherein the acid is propionic acid.
4. The process for stabilizing heat-sensitive solid polypyrrolidone against loss of weight on heating, which consists essentially in contacting granular polypyrrolidone with a dilute aqueous solution of a lower aliphatic monocarboxylic acid, separating the polypyrrolidone from the said aqueous solution and drying the polypyrrolidone; said polypyrrolidone being insoluble in said aqueous acid solution.
5. The process for stabilizing heat-sensitive solid polypyrrolidone against loss of weight on heating, which comprises the steps of slurrying granular polypyrrolidone with an aqueous solution containing from about 0.5 to about 25 percent of a lower aliphatic monocarboxylic acid, separating the polypyrrolidone from the said aqueous solution and drying the polypyrrolidone; said polypyrrolidone being insoluble in said aqueous acid solution.

References Cited in the file of this patent

UNITED STATES PATENTS

| | | |
|---|---|---|
| 2,241,322 | Hanford | May 6, 1941 |
| 2,638,463 | Ney et al. | May 12, 1953 |
| 2,657,972 | Woodward | Nov. 3, 1953 |
| 2,711,398 | Barnes et al. | June 21, 1955 |
| 2,734,043 | Crowther | Feb. 7, 1956 |

FOREIGN PATENTS

| | | |
|---|---|---|
| 205,015 | Australia | Jan. 31, 1957 |
| 782,452 | Great Britain | Sept. 4, 1957 |